United States Patent [19]
Heisch

[11] Patent Number: 6,006,033
[45] Date of Patent: Dec. 21, 1999

[54] METHOD AND SYSTEM FOR REORDERING THE INSTRUCTIONS OF A COMPUTER PROGRAM TO OPTIMIZE ITS EXECUTION

[75] Inventor: Randall Ray Heisch, Austin, Tex.

[73] Assignee: International Business Machines Corporation, Armonk, N.Y.

[21] Appl. No.: 08/291,370

[22] Filed: Aug. 15, 1994

[51] Int. Cl.⁶ ........................................ G06F 9/445
[52] U.S. Cl. .................. 395/709; 711/125; 711/134
[58] Field of Search ........................ 395/425, 428, 395/412, 416, 419, 421.03, 421.04, 421.07, 735, 736, 739, 741, 705, 709; 710/262, 263, 266, 268; 711/100, 202, 101, 134, 206, 213, 214, 125, 217, 133

[56] References Cited

U.S. PATENT DOCUMENTS

| | | | |
|---|---|---|---|
| 4,462,077 | 7/1984 | York | 364/300 |
| 4,833,604 | 5/1989 | Cheng et al. | 364/200 |
| 4,965,724 | 10/1990 | Utsumi et al. | 395/700 |
| 5,021,945 | 6/1991 | Morrison et al. | 395/375 |
| 5,067,073 | 11/1991 | Andrews | 395/375 |
| 5,088,034 | 2/1992 | Ihara et al. | 395/700 |
| 5,121,489 | 6/1992 | Andrews | 395/375 |
| 5,175,856 | 12/1992 | Van Dyke et al. | 395/700 |
| 5,193,180 | 3/1993 | Hastings | 395/575 |
| 5,212,794 | 5/1993 | Pettis et al. | 395/700 |
| 5,247,693 | 9/1993 | Bristol | 395/800 |
| 5,265,254 | 11/1993 | Blasciak et al. | 395/700 |
| 5,446,876 | 8/1995 | Levine et al. | 395/184.01 |
| 5,502,826 | 3/1996 | Vassiliadis et al. | 395/375 |
| 5,504,925 | 4/1996 | Jeffs | 395/800 |

FOREIGN PATENT DOCUMENTS

WO 92/16894  10/1992  WIPO.

OTHER PUBLICATIONS

IBM TDB "Controlling Code Optimization Based on Debug Requirements", vol. 36, No. 05, May 1993, pp. 305–306.
University of Wisconsin Computer Sciences Technical Report 1083, "Rewriting Executable Files to Measure Program Behavior," by James R. Larus et al, Mar. 25, 1992, pp. 1–17.

*Primary Examiner*—Larry D. Donaghue
*Attorney, Agent, or Firm*—Mark E. McBurney; Richard A. Henkler

[57] ABSTRACT

A system and method are provided that allows the results of an instruction trace mechanism to globally restructure the instructions. The process reorders the instructions in an executable program, using an actual execution profile (or instruction address trace) for a selected workload, to improve utilization of the existing hardware architecture. The reordering of instructions is implemented at a global level (i.e., independent of procedure or other structural boundaries which maximizes speedup) running on various hardware platforms and adds the ability to preserve correctness and debuggability for reordered executables. An unconditional branch instruction is added at the memory locations where reordered instructions previously were stored. When a dynamic branch occurs, the program will attempt to access the instruction at the original address and the unconditional branch directs the program to the reordered location of the instruction and program integrity is maintained.

9 Claims, 11 Drawing Sheets

|  | ORIGINAL | | | | REORDERED | | |
|---|---|---|---|---|---|---|---|
| Cache Line 1 | 0x10000330 | l | r2,0x14(r1) | 60 | 0x10000330 | b | 0x10000590 |
|  | 0x10000334 | l | r3,0x38(r1) |  | 0x10000334 | b | 0x10000594 |
|  | 0x10000338 | cmp | cr1,r2,r3 |  | 0x10000338 | b | 0x10000598 |
|  | 0x1000033c | bne | 1,0x10000374 |  | 0x1000033c | bne | 1,0x10000374 |
|  | 0x10000340 | ai | r3,r31,0x8 |  | 0x10000340 | ai | r3,r31,0x8 |
|  | 0x10000344 | l | r4,0x38(r1) |  |  |  |  |
|  | 0x10000348 | bl | 0x10000530 |  |  |  |  |
|  | 0x1000034c | l | r2,0x14(r1) |  |  |  |  |
| 62 | 0x10000350 | ai | r3,r31,0x1c |  |  |  |  |
|  | 0x10000354 | l | r4,0x38(r1) |  | 0x10000590 | l | r2,0x14(r1) |
|  | 0x10000358 | bl | 0x10000530 |  | 0x10000594 | l | r3,0x38(r1) |
|  | 0x1000035c | l | r2,0x14(r1) |  | 0x10000598 | cmp | cr1,r2,r3 |
|  | 0x10000360 | ai | r3,r31,0x30 |  | 0x1000059c | beq | 1,0x10000340 |
|  | 0x10000364 | l | r4,0x38(r1) |  | 0x100005a0 | l | r3,0x3c(r1) |
|  | 0x10000368 | bl | 0x10000530 |  | 0x100005a4 | l | r4,0x38(r1) |
|  | 0x1000036c | l | r2,0x14(r1) |  | 0x100005a8 | bl | 0x100005b0 |
| Cache Line 2 | 0x10000370 | b | 0x10000384 |  | 0x100005ac | b | 0x100005d8 |
|  | 0x10000374 | l | r3,0x3c(r1) |  | 0x100005b0 | stu | r1,-64(r1) |
|  | 0x10000378 | l | r4,0x38(r1) |  | 0x100005b4 | st | r3,0x58(r1) |
|  | 0x1000037c | bl | 0x10000278 |  | 0x100005b8 | st | r4,0x5c(r1) |
|  | 0x10000380 | st | r3,0x40(r1) | 64 | 0x100005bc | l | r3,0x58(r1) |
|  | 0x10000384 | l | r3,0x38(r1) |  | 0x100005c0 | srai | r3,r3,0x3 |

FIG. 3

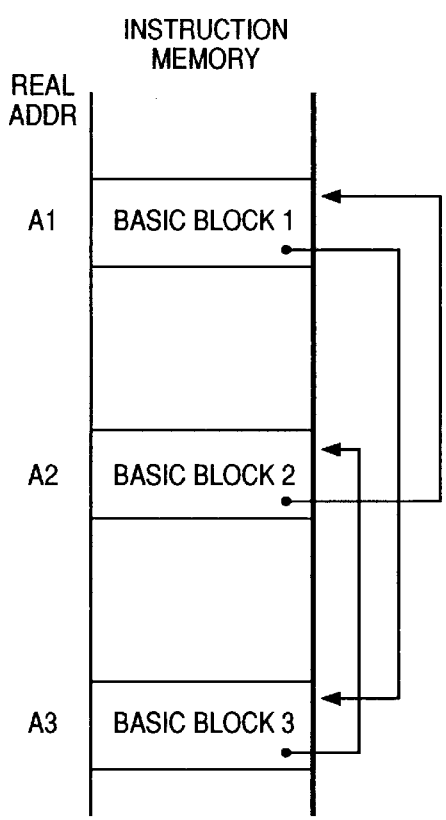
FIG. 9A
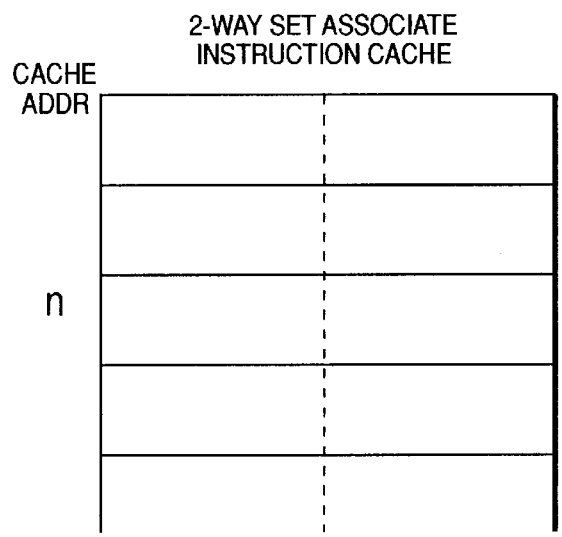
FIG. 9B
REAL/CACHE
ADDRESS MAPPING
| REAL ADDR | CACHE ADDR |
|---|---|
| A1 | n |
| ⋮ | |
| A2 | n |
| ⋮ | |
| A3 | n |
FIG. 9C

METHOD AND SYSTEM FOR REORDERING THE INSTRUCTIONS OF A COMPUTER PROGRAM TO OPTIMIZE ITS EXECUTION

BACKGROUND OF THE INVENTION

1. Field of the Invention

The present invention relates to restructuring the order of a program running on a computer system to improve performance of the program. More specifically, the invention is a system that globally reorders instructions in a computer program, in order to optimize its performance, while maintaining its functionality, debuggability and structure.

2. Description of Related Art

Current high-performance computer memory architectures are optimized for programs which exhibit high spatial and/or temporal locality for both instructions and data. Memory hierarchies have evolved in an attempt to minimize cost and maximize performance by exploiting this "locality of reference" program characteristic. Basically, "locality" refers to accessing locations in memory (including cache memory) which are close to one another. It is most efficient to fill, or "pack" instructions and data (information) as closely as possible into memory. Otherwise, the program will spend a great deal of time searching widely scattered memory locations for the needed data and/or instructions.

The improved performance offered by cache memory is due primarily to the program characteristic of "locality of reference". This implies that a program usually references data or instruction memory in confined, physically close groups. A program which exhibits good "locality of reference" for either data or instruction memory references will usually realize improved performance when cache memory is present.

Cache memory is usually one of direct mapped, n-way set associative, or fully associative. Due to the expense of implementing a fully associative cache, cache memory is typically implemented as either direct mapped or n-way set associative. FIG. 8a illustrates a 2-way set associative cache. A 2-way set associative cache has two sets of memory for each cache address. As shown in FIG. 8b, two or more real addresses can share the same cache address, which reduces the probability of a cache miss and thus improves performance (as compared to a direct mapped cache). A cache miss occurs when a memory reference does not find its data in the cache and usually results in a 10× or more cycle time penalty.

However, a cache performance problem arises when a CPU must repeatedly fetch instructions that are separated by the approximate size of the cache set (e.g, not exhibiting good locality of reference). For example, FIG. 9a illustrates a tight program loop between three, physically separate basic blocks. For this example, the location of instructions is assumed separated by the size of the cache set. Under these conditions, real memory address A1, A2, and A3 all map to the same cache address (n). Since the cache is 2-way set associative, there is only room for 2 instructions at cache address n and, therefore, this code sequence will suffer extreme performance degradation due to constant cache "conflict" misses on at least one of every instruction fetches for each basic block throughout the execution of the loop.

Further, cache memory is usually allocated by the cache line which is typically much larger than a single instruction. Each reference to sparse or non-local instructions results in the allocation of a full cache line. The additional instructions brought into the cache, but not used, degrade cache utilization efficiency, increase cache misses, and reduce overall performance.

To reduce the chance of cache misses, it would be desirable to group instructions which are executed together in code loops as close together as possible.

Further, design assumptions are typically made regarding other program characteristics (such as branching behavior) which result in processor designs optimized for those assumed characteristics (such as branch prediction).

As long as these program assumptions hold, processor performance is maximized. However, when a program deviates from these assumed characteristics, the processor architecture is inefficiently utilized, which usually leads to reduced performance or excessive use of real memory.

While hardware design tradeoffs are made on the basis of software-related assumptions, compilers attempt to generate "optimum" code targeted for a specific hardware architecture (including the memory hierarchy) on the basis of similar program assumptions. However, compiler optimizations are usually limited to a purely static analysis of a program which includes speculation as to how a program will probably execute on a given hardware platform. Additionally, since many programs result from binding together multiple, separately compiled (or assembled) object modules, the compiler does not usually have a "global view" of the final organization of the executable image (program code) and therefore cannot perform a truly global optimization.

It can be seen that a need exists for a system that will allow the global reordering of instructions in a program while maintaining its structure and debuggability.

SUMMARY OF THE INVENTION

In contrast to the prior art, the present invention is a system that uses the results of an instruction trace mechanism to globally restructure the instructions, i.e. trace-directed program restructuring (TDPR) for executable programs while maintaining the functionality of the program and its debuggability.

Broadly, TDPR is the process of reordering the instructions in an executable program, using an actual execution profile (or instruction address trace) for a selected workload, to improve utilization of the existing hardware architecture. Generally, the application of TDPR results in faster programs, programs that use less real memory, or both. The present invention applies these concepts to executable programs at a global level (i.e., independent of procedure or other structural boundaries) running on various reduced instruction set computer (RISC) platforms, such as the Power, Power2 and PowerPC Architectures available from IBM Corp. (Power, Power2 and PowerPC are trademarks of IBM Corporation) and adds the ability to preserve correctness and debuggability for reordered executables. It can be seen that the present invention has particular usefulness for system designers that wish for an existing program to optimally run on their system configurations. Additionally, it is useful to have the ability to restructure a program to run more efficiently on an existing system configuration. Further, the present invention adds unconditional branch instructions at the memory locations where reordered instructions previously were stored. When a dynamic branch occurs, the program will attempt to access the instruction at the original address. In prior art systems the program would fail, however, the unconditional branch of the present invention directs the program to the reordered location of the instruction and program integrity is maintained.

TDPR effectively "closes the loop" in the optimization process. It attempts to further optimize a program by collecting information on the actual behavior of a program while it is executed and uses that information to reorder and modify instructions across the entire executable program image to optimize the use of the hardware.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 3 illustrates the instruction reordering and optimization of the present invention wherein frequently used instructions are grouped together;

FIGS. 9a to 9c are pictorial representations of an example of instruction cache conflict misses due to a 2-way set associative cache;

DETAILED DESCRIPTION OF THE PREFERRED EMBODIMENTS

Figure 1:
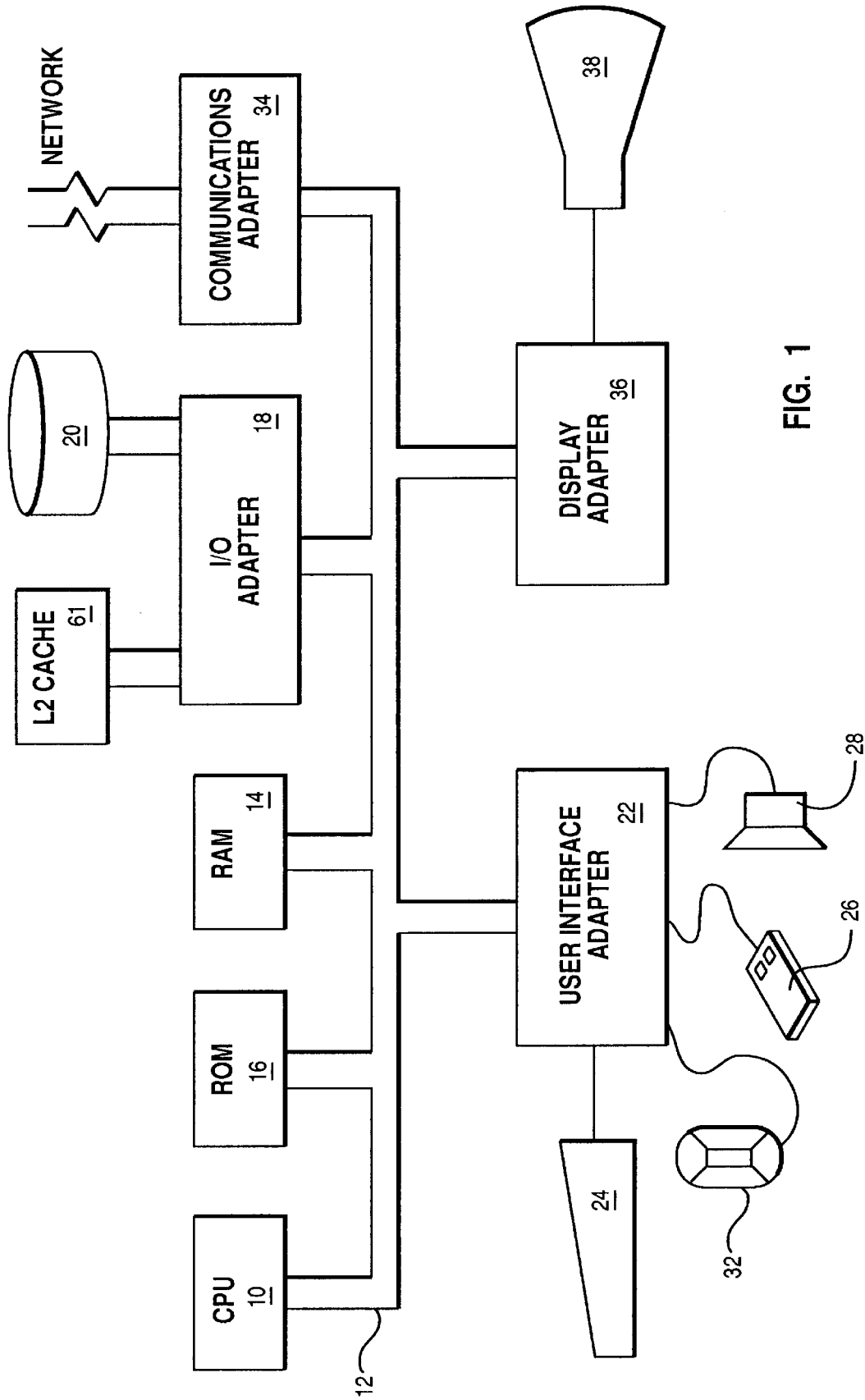
FIG. 1 is a diagram of the components included in a typical computer system which includes the present invention.

Referring to FIG. 1, a typical data processing system is shown which may include the present invention. A central processing unit (CPU), such as one of the PowerPC 6XX microprocessors available from IBM or Intel X86 processors is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20 and a level two (L2) cache 61. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, trackball 32 or mouse 26 and receiving output from the system via speaker 28 and display 38. Additionally, an operating system such as DOS or the OS/2 system (OS/2 is a Trademark of IBM Corporation) is used to coordinate the functions of the various components shown in FIG. 1.

Figure 2:
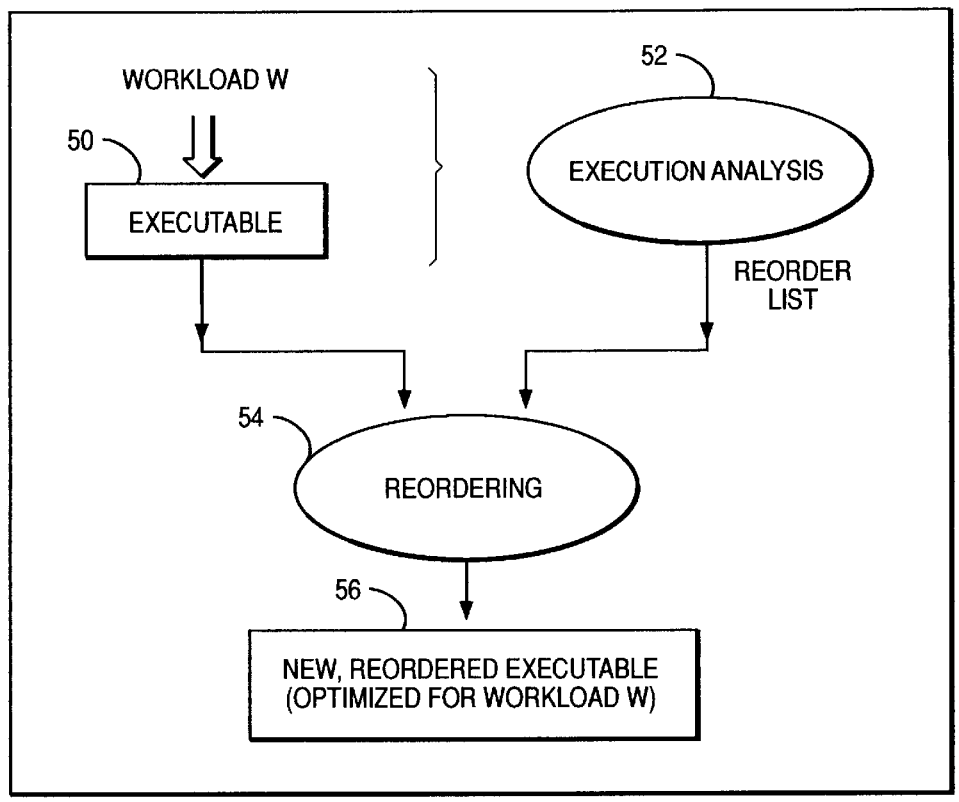
FIG. 2 is a high level flow diagram showing the process of the present invention wherein instructions are globally reordering.

FIG. 2 is a flow diagram depicting the process the present invention performs. A given program to be optimized is run at a specific workload, i.e. a particular set of constraints or parameters that exercise the program in a specific manner. A workload is typically in the form of program input, such as iterative instructions or a file, or the like, which causes the program to exercise different parts of its code, possibly in different sequences or amounts. Some programs behave almost exactly the same regardless of the program input set (workload). However, other programs behave radically different based on the workload. Thus, a particular program application may run in a certain manner, given a specific workload, i.e. specific program input. However, the same program application may run radically different given another set of program inputs. Thus, ideally the program application will be optimized for the workload on which it is to be run.

Generally, the workload is used which will exercise the program in the most typical manner. One aspect of restructuring a particular program is the need to determine an appropriate workload to use while reordering a program. If two different workloads exercise a program in a completely different manner, finding a single address reorder list that is optimal for both workloads is improbable.

For example, if a program is reordered for workload A and the reordered version is then run on workload A the results may be a speedup of M percent. Similarly, a version reordered for workload B is run on workload B and results in a speedup of N percent. However, reordering a third version of the program for both workloads A and B together, where the workloads use and exercise the program very differently, and then running that version separately on both workloads usually results in speedups of less than M or N percent. Further, running a reordered program on workload C, where workload C was not in the set of workloads used to reorder the program, typically also yields little (or possibly negative, i.e. the program runs slower) improvement if workload C is very different from the other workloads.

The process of applying the present invention to generate a trace-directed program restructuring is illustrated in FIG. 2. First, the executable program to be restructured is run for the desired workload (W) while an instruction address trace (or execution profile) is captured and analyzed. The result of this analysis is an address reorder list which represents the "optimal" ordering of the instructions in that executable program image for the given workload. Second, the address reorder list and the executable program file are used to create a new, restructured, executable by reordering the instructions from the original program in the sequence specified in the reorder list. The reordered executable resulting from applying the TDPR process will exhibit varying degrees of performance improvements and/or reduced instruction memory requirements when run on workload W (or similar workloads). More particularly, a trace tool 52 is used to record the actual program instructions for the original executable program 50, running on a particular workload. Trace tool 52 determines trace information, such as what functions the instructions perform and the address(es) at which the instructions are stored. Tool 52 may also determine profile information which give an event count corresponding to various operations, e.g. memory accesses performed by the system. The trace tool 52 is run on the system, such as is shown in FIG. 1 in conjunction with the present invention. Once the executable program 50 is traced the present invention 54 is used to globally reorder the sequence of the program instructions and outputs a new, reordered executable file 56 for the program.

FIG. 3 is a table showing a plurality of actual instructions corresponding to a particular function written in source code. For example consider the following program sequence in a typical high-level language code sequence:

```
if ( x = = y )
    {
    /* Error handler code */
    }
/* Otherwise, execution continues here */
```

In this code sequence, the error path (taken when variable x is equal to variable y) is usually not executed (information which is not known at compile time). That is, an error is not normally encountered, therefore, the error handler code is not normally executed. FIG. 3 shows the resulting assembler code, stored in e.g. cache 61, generated for a typical code sequence of this type. The example represents a machine with 16 instructions per instruction cache line. Notice that although only the first four instructions are usually executed, i.e. instructions for the if (x==y) statement, the remaining unexecuted instructions (representing the error handler code) are also loaded into the cache. Since the minimum allocatable unit of a cache (typically a cache line) is usually much larger than a single instruction, poor program locality results in higher miss rates, and therefore reduced performance, due to inefficient cache utilization. Similarly, real memory space may be wasted on instructions which are usually not executed but, due to their proximity to frequently executed code, are loaded when a real page is allocated.

FIG. 3 also shows the results of reordering the instructions according to the way in which they are executed. On the basis of information collected at runtime, the frequently executed code paths are grouped together. The result is improved performance due to reduced instruction cache and TLB (translation lookaside buffer) miss rates and a reduction in runtime memory requirements (due to improved utilization of real memory pages).

More particularly, FIG. 3 shows a set of assembler code stored in cache 61 corresponding to the above described high level language. That is, block 60 corresponds to the if (x==y) statement. This decision point is always encountered each time the program is executed. Therefore, the instructions in block 60 are always executed. However, the block 62 instructions that implement the /*Error handler code*/ function which calls the error handler code when x equals y are not always executed. It can be seen that the error handler code will be called in only a small minority of cases, i.e. the majority of time the system will run normally with no errors. Therefore, it is a waste of cache space to load the block of instructions 62, since they are rarely executed. Block 64 includes the instructions corresponding to /* Otherwise, execution continues here */ in the high level language. Thus, the instructions represented by block 64 are always encountered when the program is run.

In the present example, each cache line includes 16 instructions. Those skilled in the art will understand that a cache line represents the smallest block of instructions that can be loaded into a cache, and that cache lines may correspond to other than 16 instructions. A problem exists since selective loading of instructions in a cache is not allowable in increments of less than 16 instructions. In the example of FIG. 3 it would be desirable to only load the instructions of block 60 in cache 61, since they are the most frequently used instructions, i.e. load 4 instructions out of the 16 instructions corresponding to cache line 1. To solve this problem the present invention reorders, or packs the most commonly used instructions into a cache line until a block of instructions equal to a cache line can be loaded in the cache. In the example of FIG. 3, block 66 includes the most commonly used instructions (blocks 60 and 64) from cache lines 1 and 2. Thus, the reordered instructions will provide a more efficient use of cache space since block 66 contains the most commonly used instructions.

Also, the conditional branch instruction code has been rewritten with a different branch target address and the opposite (reversed sense) condition code (from a BNE Target_Address to BEQ Fall_Thru_Address). This illustrates an additional opportunity to improve performance, on the basis of actual program behavior, by reducing inefficient use of available hardware optimizations (which, in this case, are reduced pipeline stalls due to incorrectly predicted-not-taken branches). That is, the present invention is often able to optimize the performance of the code, not only by saving cache space, but also by the reordering of instructions. In the original structure of the program, the high level language, if (x==y), causes the error handler code to be implemented, when this statement is true. However, the vast majority of the time this statement is not true and x does not equal y. Therefore, the present invention has restructured the instructions in block 60 to implement the high level language statement, if (x not equal Y). Thus, this statement addresses the most common occurrence, which is when no error is present and the error handler code is not required. Thus, the optimized program now operates more efficiently since the most commonly encountered situation is addressed. That is, when x does not equal y then the program continues execution. This is the case presented by the instructions of block 66.

Another improvement, which results indirectly from stringing together frequently executed code paths, is that of reduced collisions in an N-way set-associative cache. If more than N instructions in a highly executed code loop map to the same cache congruence class (address), constant cache misses will occur because of the thrashing which results from these collisions. Reordering the instructions in a program according to the actual execution path potentially produces additional performance improvements by reducing "conflict misses" in an N-way set-associative cache.

Figure 4:
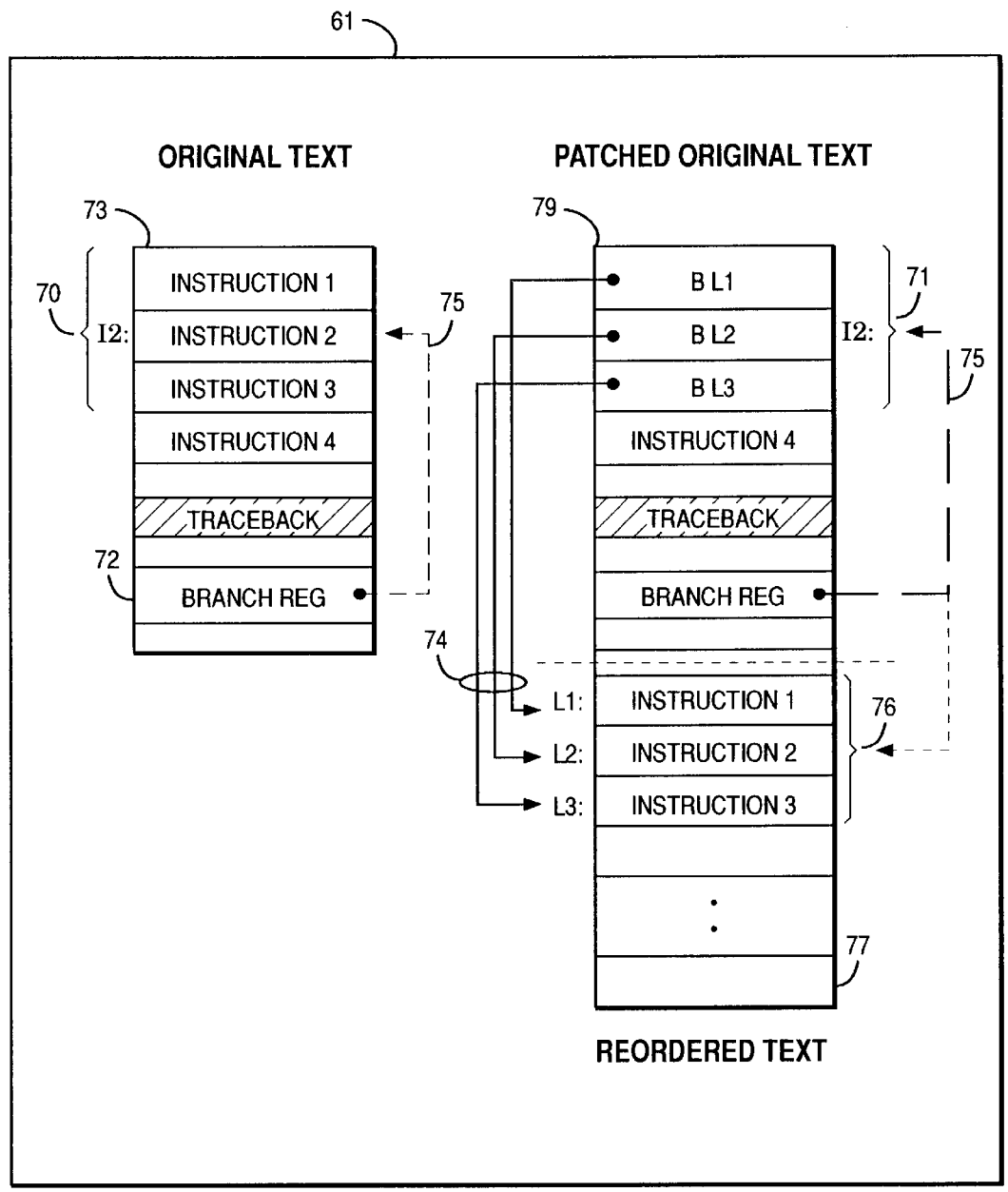
FIG. 4 is a block diagram showing the unconditional branches of the present invention wherein the program structure and functionality is maintained.

FIG. 4 illustrates an aspect of the present invention where an unconditional branch is utilized to maintain program functionality and debuggability.

The design and implementation of trace-directed program restructuring for executable programs entails solving two major problems: 1) managing dynamically calculated branches (computed goto's) and 2) generating an "optimal" address reorder list. Once these problems are solved, the remainder of the effort revolves around the fairly simple repositioning and accounting required to build the reordered executable.

In this implementation, the minimum reorderable unit is the basic block (a basic block is defined as a sequence of instructions that has exactly one entry point and exactly one exit point). The addresses specified for TDPR are the addresses of the first instruction in the basic block. When a basic block is moved while reordering an executable, all the instructions in the basic block are moved together.

The branch target or destination address of a dynamically calculated branch (DCB) is calculated as a program runs and is usually difficult if not impossible to determine statically. For many RISC processors, the DCB takes the form of a branch-to-register instruction. In order to move instructions during TDPR, some mechanism must be provided to eliminate the problem of a DCB calculating and branching to the address of an instruction that has been moved. One such mechanism would be to attempt to recognize all possible types of DCBs generated for some subset of all compilers (and compiler versions) used to create the executable programs. The problem with this approach is that it is not fail-safe, and program functionality or correctness cannot be guaranteed because of the possibility of unanticipated code sequences (which might arise with different compiler versions or with user-written, "non-standard" assembler programs).

The mechanism developed to manage dynamically calculated branches for this implementation of TDPR is illustrated in FIG. 4. The idea is to keep the original text (instruction) section intact except for instructions that are reordered (i.e., moved during TDPR). Reordered instructions are appended to the end of the original executable (in the "reordered text area") and are replaced (in the "original text area") with branches to the addresses of where the instructions have been moved.

For example, a block 70 of instructions 1, 2 and 3 in the original text section 73, shown in FIG. 3, which have been moved to locations L1, L2 and L3 in block 76 in the reordered text area 77. The original instructions in the patched original text area 79 have been replaced with branches 71 (B) to locations L1, L2 and L3 respectively. Branches 71 cause the program to jump to block 76 along paths 74. Instruction 4 and the Branch reg 72 (branch to register) instruction, which are not part of a frequently executed code path in this example, are not moved. Additionally, all traceback entries (which are embedded at the end of each procedure for program debug) are removed from highly executed code paths (i.e., not moved with reordered code) but are maintained in the original text section for debuggability. With this mechanism in place, if an unanticipated DCB attempts to branch to the address of a moved instruction (such as the Branch reg to location I2), it will simply encounter the branch (B L2) to the new location of the instruction and then branch to that new location, thus preserving functionality and debuggability.

Although this technique for managing DCBs does maintain functionality for most programs (high-level language and assembler alike), it can be undesirable from the perspective of performance and memory utilization because of the double branch sequence, resulting from undetected DCBs, which usually forces two memory pages to be touched. For example, it can be seen that the branch reg 72 will cause the program to return to instruction 2 by a first branch along path 75. A second branch then occurs from block 71 to block 76 due to the unconditional branch instruction B L2. Thus, two branches occur which can have an impact on performance. However, the vast majority of DCBs found in most executable programs are due to 1) the C switch/case statement (which typically generates a branch table in the program constant area) and 2) calling a function through a pointer (which uses a function descriptor in the program data area). This double branch sequence can usually be eliminated by updating the addresses of moved instructions, in the branch tables, and function descriptors with the new reordered addresses. In this implementation of TDPR, both the branch tables and the function descriptors are scanned for the addresses of moved instructions and are (optionally) modified with the correct reordered addresses.

Using this mechanism for managing DCBs, a branch to the reordered text area is executed once when a program first begins; from that point on, execution is constrained to the optimized reordered text area. If, however, an unanticipated DCB (i.e., one that is undetectable and/or cannot be modified) is encountered during program execution, the performance improvement gained by reordering may degrade slightly but the program will continue to produce the expected results.

Figure 5:
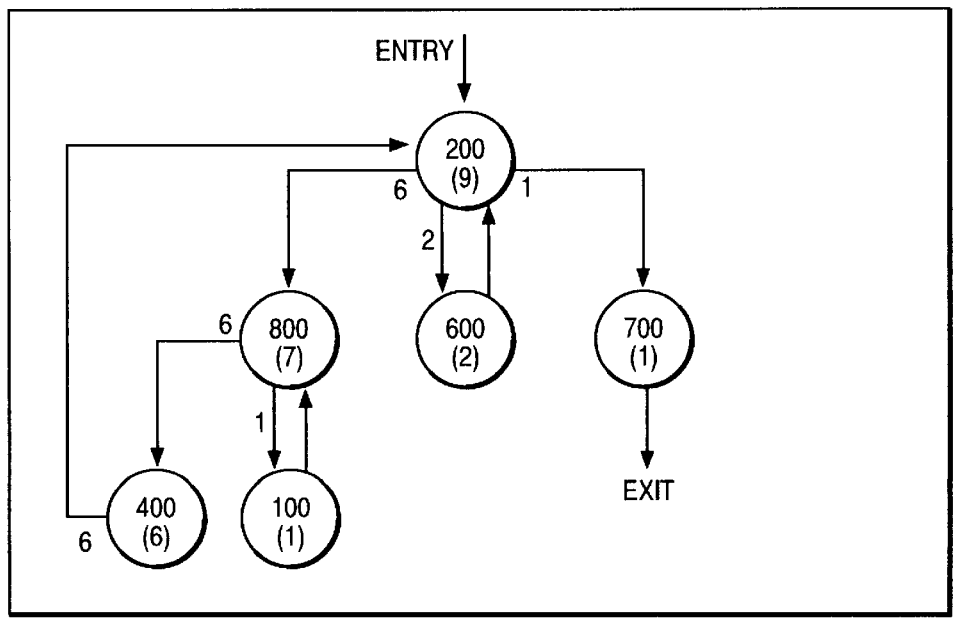
FIG. 5 is a flow graph illustrating the most frequently used path between blocks of instructions.

FIG. 5 is a directed flow graph (DFG) showing blocks of instructions that are most frequently accessed.

To apply TDPR to a program, the instruction address trace (or profile) collected (using a trace tool) during program execution must first be analyzed to determine an "optimal" basic block ordering which will result in the maximum speedup (execution time improvement) and/or memory requirement reduction. Determining the optimal ordering of the basic blocks in a program is a challenging problem. The approach used here is to identify the most frequently executed paths through the code by building a directed flow graph (DFG) from the address trace (or profile) collected during program execution.

The DFG, as shown in FIG. 5, consists of a node for every basic block with an associated count of the number of times that a particular basic block was executed. Additionally, each node has one or more edges (or pointers), with associated counts, to the node of the basic block or blocks which are executed next. For example, FIG. 5 shows the DFG generated for the following sequential instruction address trace:

200, 800, 100, 800, 400, 200, 800, 400, 200, 800, 400, 200, 800, 400, 200, 800, 400, 200, 800, 400, 200, 600, 200, 600, 200, 700

In this example trace, the basic block at address 200 is executed first, followed by the basic blocks at addresses 800, 100, 800 and so on up to the last basic block at address 700. The basic block at address 200 was executed a total of nine times, six of which ended in transferring control to the basic block at address 800, two going to 600, and one to address 700. As can be seen in the DFG, the frequently executed or "hot" code path for this address trace is the sequence 200-800-400.

The process used in this implementation for generating the reorder list is described as follows:

1. Build the DFG from the instruction address trace or profile as shown in FIG. 5.
2. Provide the following alternate methods for traversing the DFG to produce the address reorder list:
    a. Starting with the most frequently executed basic block (200), follow the most frequently executed paths (e.g. 200-800-400) until a cycle is detected (i.e., a previously visited basic block). As each basic block node is visited in the DFG, append the basic block address to the address reorder list. When a cycle is detected, restart the process at the next most frequently executed address. This is the np=0 option.
    b. Same as (a) except that when a cycle is detected, back up one node and then go visit each next most frequently executed basic block. This is the np=1 option.

c. Same as (b) except that when backing up to visit each next most frequently executed basic block, visit only those nodes which are executed next more than N times. This is the np=N option.

Table 1 shows the address reorder lists generated for the DFG shown in FIG. 4 using this algorithm.

TABLE 1

| np = 0 | np = 1 | np = N = 2 |
|--------|--------|------------|
| 200    | 200    | 200        |
| 800    | 800    | 800        |
| 400    | 400    | 400        |
| 600    | 100    | 600        |
| 100    | 600    |            |
| 700    | 700    |            |

While the slight differences in the reorder lists shown may appear inconsequential, the performance differences can be significant for large code sequences which approach or exceed the size of the instruction cache. Selecting the appropriate np option, however, is usually a matter of trial and error (although the np=0 option usually provides the best speedup for most programs in this implementation).

Figure 6:
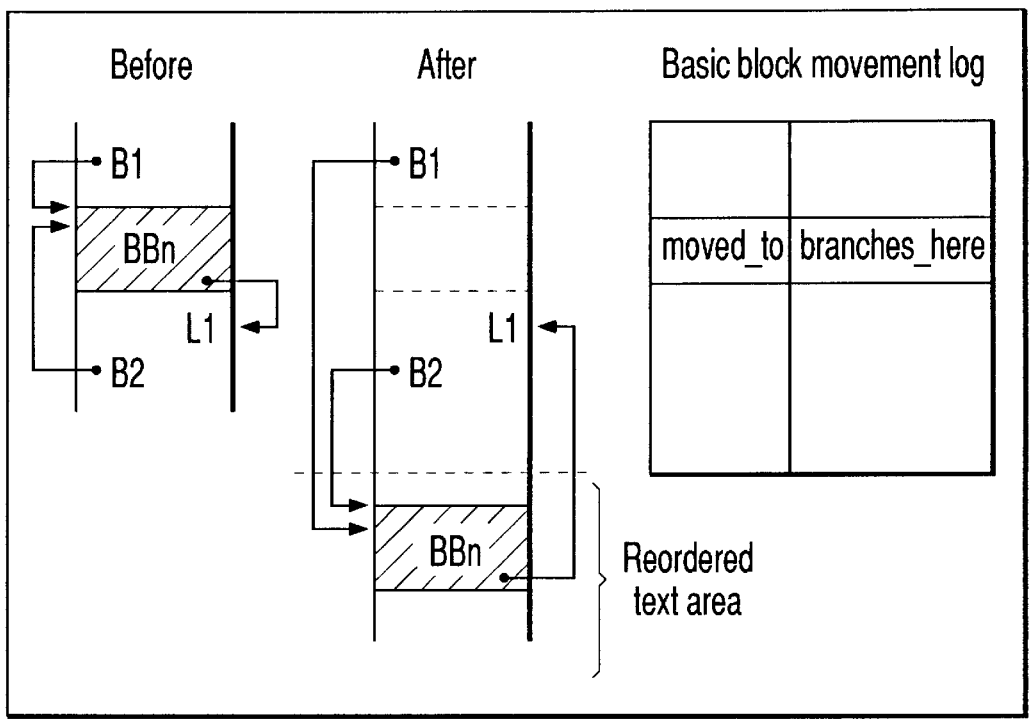
FIG. 6 is a diagram showing how the present invention tracks the movement of basic blocks of instructions that occurs when reordering occurs.

FIG. 6 is diagram which tracks the movement of basic blocks. The remainder of the implementation of the present invention involves the tasks required to accommodate the movement of basic blocks within the program while maintaining the expected functionality. In this implementation of TDPR, basic blocks are moved sequentially in a single pass as specified in the address reorder list.

The diagram shown in FIG. 6 illustrates the movement of a basic block (BBn) from its original position in the program to its new location (in the reordered text area). In this example, basic block BBn branches to the basic block at address L1, and two basic blocks (B1 and B2) both branch to BBn. When a basic block is moved, both the branch out of the basic block (e.g. to L1; if it exists) and all branches into the basic block (e.g. from B1 and B2) must be adjusted.

Basic block movement is managed by maintaining a dual entry log for each basic block in the original text section. The first entry is an address that indicates where the basic block for this log entry has been moved. The second entry is a pointer to a list of all basic blocks that branch to the basic block for this log entry. Whenever a basic block is moved, the moved_to log entry for that block is assigned the new address of the basic block, and all basic blocks which branch to the block to be moved (indicated by the branches_here entry) are adjusted to branch to the new location.

During the course of moving basic blocks while applying TDPR, the opportunity or requirement may arise to modify the branch that usually terminates a basic block. This modification may come in one of the following forms:

1. Changing the sense of a conditional branch (and modifying the branch target address) to improve hardware branch prediction.
2. Converting to a branch sequence to handle "branch target out of range" and "moved fall-through code" problems. The "branch target out of range" problem occurs if a target address is not reachable from the address of a branch instruction (because of the size of the branch displacement field in the instruction); "moved fall-through code" problems occur if the code which follows a basic block is moved elsewhere.
3. Adjusting branch target addresses due to moved basic blocks.
4. Eliminating a branch instruction altogether.

The branch replacement algorithm in this implementation consists of two main cases: 1) branch-to-register, and 2) branch immediate (not to register). For the branch-to-register case, if the basic block at the fall-through address (i.e., immediately following the basic block) will not be moved next, an additional branch to the fall-through code is inserted (if needed). For the conditional branch immediate, depending upon whether the basic block at the fall-through or target address is the next basic block in sequence, the branch condition is adjusted (if possible and necessary) such that the branch will be predicted correctly most often (where the sequence of the basic blocks from the reorder list implies the most frequently executed path). Also, the branch target range for existing or modified branches is examined, and unconditional "far" branches are added if the branch target or fall-through address is out of range.

Applying TDPR to user-level application programs involves the following steps. In the following example, the application program is assumed to be running on the AIX operating system (AIX is a trademark of IBM). However, it should be understood that the procedures and description will apply equally as well to other applications running other operating systems.

1. Reading/decoding the AIX XCOFF (extended Common Object File Format) executable program code and collecting the different sections (data, text, etc.)
2. Reordering the text section. This is done by applying the techniques described above and appending the reordered code to the end of the original text section. The size of the text section specified in the XCOFF text header is adjusted accordingly.
3. Applying any "fix-ups" to the branch tables (for switch/case statements), to the function descriptors in the data section (for function calls through pointers), and to any other XCOFF sections (such as debug information).
4. Writing out the new executable XCOFF file image of the reordered program.

Using the present invention both user-level application programs and operating system (kernel) code, improvements in execution time of up to 73% and reduced instruction memory requirements of up to 61% were measured.

One disadvantage of the present invention as described herein is the increase in size of the executable program file (because the reordered text is appended to the original executable). However, in environments where disk space is not an extremely critical resource, trading additional disk storage requirements for both improved performance and reduced real memory requirements is usually desirable.

As mentioned previously, a program should be optimized for a particular workload. It is not always possible for a software vendor to precisely predict the exact configuration of systems on which the program will be run. Therefore, a solution to this "cross-workload effect" problem for widely varying workloads is to produce different versions of the program which are each optimized for specific workload types. Then, knowing what workload type is to be run, the reordered version of the program that is optimized for that workload type is used.

In addition to user-level executable programs, significant improvements can also be achieved by applying TDPR to base operating system (kernel) code, kernel extensions, and device drivers with the following special considerations. Implementing TDPR on executable images is not well suited to programs which utilize self-modifying or otherwise position-dependent code because of the difficulty in detecting and correcting for modifications to code that has been moved. A form of position-dependent code can be found in system-level software (such as the base kernel, kernel extensions, and device drivers) which utilizes pinned instruction memory. Pinned memory is memory (in a virtual memory system) that is never "paged out" (i.e., always present in real memory especially during interrupts and other critical times) and, therefore, will never result in page faults when referenced.

If an area of pinned instruction memory is reordered, the area in the reordered text section where those instructions are moved must also be pinned. Since the incremental level of detail (granularity) provided for pinning memory is usually at least a page, it can be quite inefficient to pin text reordered at the basic block level. One solution would be to pin the entire reordered text area. However, the base kernel usually has other position-dependent code that makes dynamic extension of the kernel more difficult than user-level code.

Figure 7:
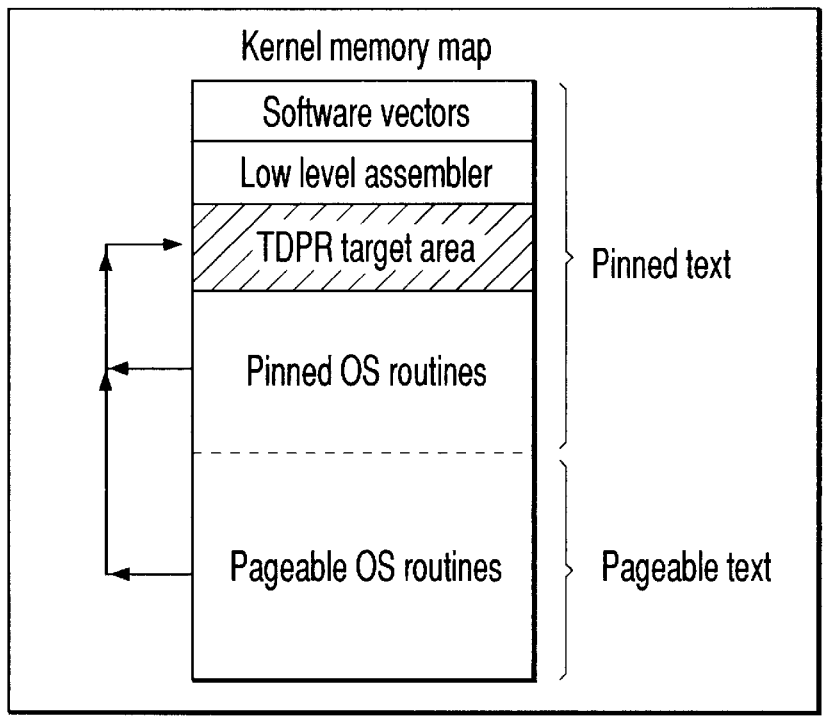
FIG. 7 is a chart of the process implemented by the present invention in applying trace directed program restructuring to kernel code in an operating system.
Figures 8A, 8B:
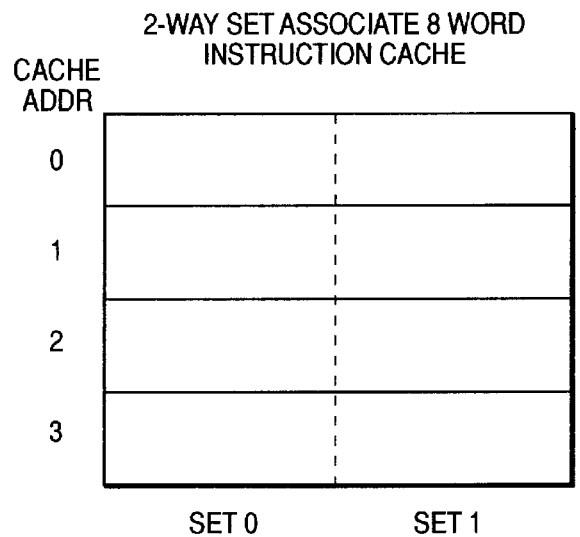
FIGS. 8a and 8b are an example of typical real address to cache address mapping.

The solution developed and implemented here relies on the standard practice of building the operating system kernel with separate pinned and pageable sections. As illustrated in FIG. 7, the kernel is built with a sufficiently large "hole" or reorder area in the pinned section; when TDPR is applied, all reordered text is moved to that pinned reorder area (TDPR target area). Through the use of this technique, reordered pinned code remains pinned and reordered pageable code becomes pinned.

Reordering an executable program as described herein can impose some additional requirements in the area of program debugging. Any debugging information embedded in the executable file that points to code which has been reordered must be adjusted either in the executable file (if possible) or during the debug process. Also, operating system kernel executables contain traceback entries at the end of every procedure which are used, among other things, to determine the procedure name for an instruction address if a program crash occurs. These traceback entries are not moved while reordering and are therefore not present in the reordered code which would cause performance degradation (but are left intact relative to the instructions in the original text section for debuggability purposes).

Debugging a TDPR-reordered executable is supported by utilizing a special TDPR XCOFF section created in the reordered executable program file which provides a cross-reference table containing the original and reordered addresses for all moved code. Using this cross-reference information, along with the original text area which still has the traceback entries in place, the debugger can function as it would with the original program.

The application of trace-directed program restructuring on programs running in a hierarchical virtual memory system has the potential to produce significant performance enhancements and reductions in real memory requirements for both user-level and kernel programs. By using the present invention, substantial performance improvements for AIX executable programs and major reductions in text real memory requirements were found. For applications where the workloads are not critical to program behavior, producing a single reordered executable to realize these improvements should be feasible. In cases where different workloads change program behavior dramatically, providing multiple executables (each reordered for a specific workload type) or reordering for the most common workload may still prove beneficial.

Figure 10:
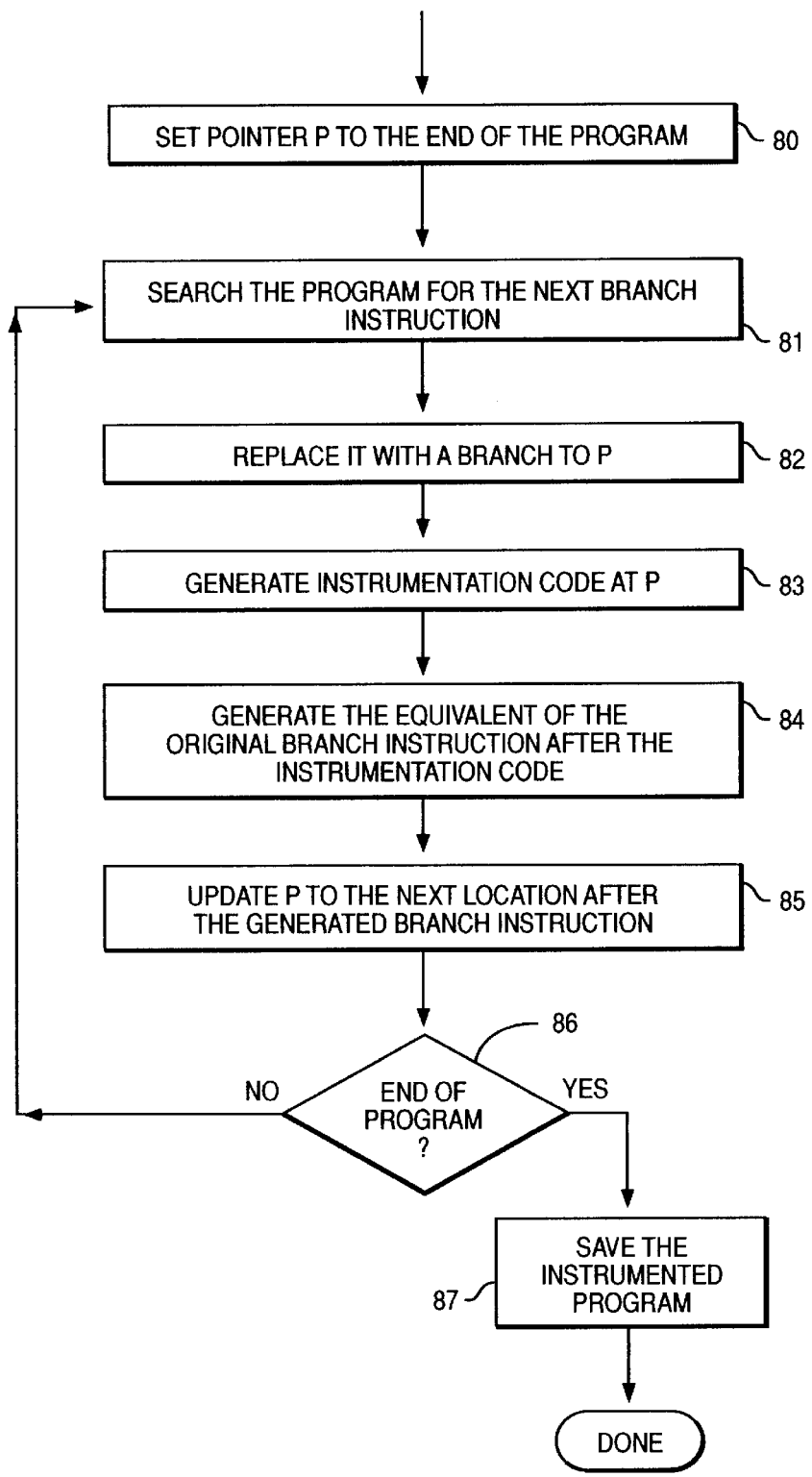
FIG. 10 shows the flow diagram of instrumenting a program for collecting trace or profile data in accordance with the present invention.

As an alternative to the external instruction address trace tool mentioned previously, the program to be reordered may be instrumented as illustrated in FIG. 10. Instrumentation involves patching every basic block (typically the first or last which is usually a branch instruction in the basic block) in the program with code that will either save the address of the basic block in the trace buffer or update profile information for that basic block. In this implementation, we instrument the branch instruction terminating the basic block. Instrumentation code is appended to the end of the program starting at the last available address plus one instruction (4 bytes). At step 80, the program begins and a pointer, p, is initialized to the start of the instrumentation code at the end of the program. The beginning of the main loop of the instrumentation code starts with a search of the program for the next branch instruction at step 81. At step 82, the branch instruction being instrumented is replaced with an unconditional branch to location p. Step 83 generates instrumentation code (as detailed below) for the branch instruction at location p. At step 84, the equivalent of the current branch instruction, which was replaced with the branch to p in 82, is generated by the present invention at the end of the instrumentation code and adjusted if necessary such that it branches (or falls through) to the correct address(es). This preserves the original program behavior in the instrumented version of the program. The pointer p is then updated at step 85 to point to the next available instrumentation code location. Step 86 then determines if there are more instructions in the program, and if so, the program loops back to step 81 and instrumentation continues, otherwise the instrumented program is saved (step 87) and the instrumentation process is complete.

Figure 11:
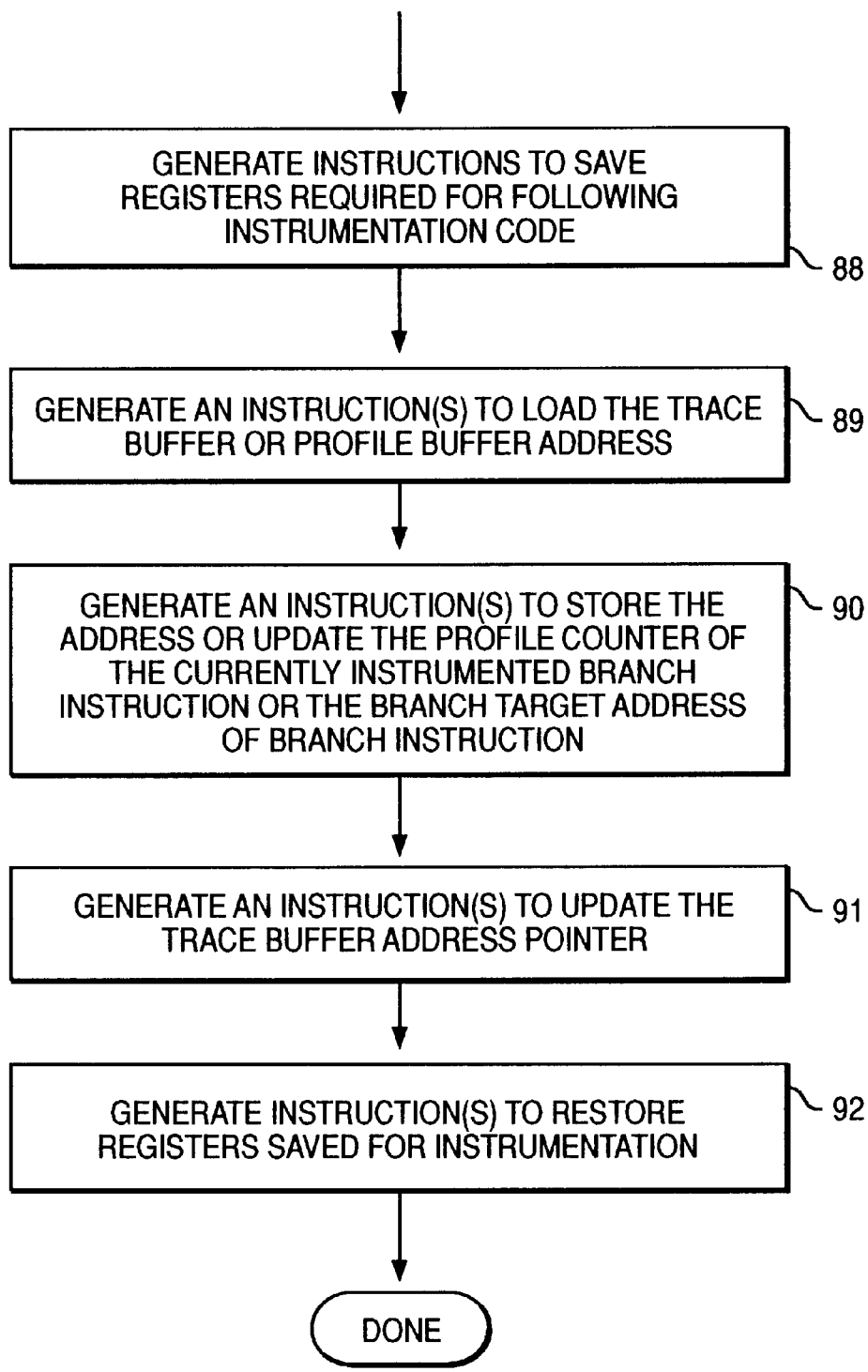
FIG. 11 illustrates the details of generating instrumentation code.

The generation of instrumentation code, at step 83, is detailed in FIG. 11. At step 88, the necessary instruction(s) are generated to save the machine state (i.e., registers) which are required for the instrumentation code to be subsequently generated. At step 89, an instruction(s) is generated to load the current trace buffer or profile buffer address. At step 90, an instruction is generated to store the address of the currently instrumented basic block in the trace buffer or update the profile counter for the same address. An instruction is then generated to update the trace buffer address pointer at step 91. Finally, the necessary instruction(s) are generated to restore the machine state (registers) used for instrumentation (step 92).

The instrumented program is then run on the processing system and used in a typical manner. During execution of the instrumented program, each basic block executed will have its associated address written to the trace buffer or updated in the profile buffer. It will be understood by those skilled in the art that the trace and profile buffers are locations in memory utilized by the trace tool to record trace information (instruction operand history) and profile information (counts of the number of times specific types of instructions are executed). Once the instrumented program has been thoroughly exercised, the trace or profile buffer is read and analyzed and the optimal reorder list, representing the optimal instruction ordering, is generated.

Figure 12:
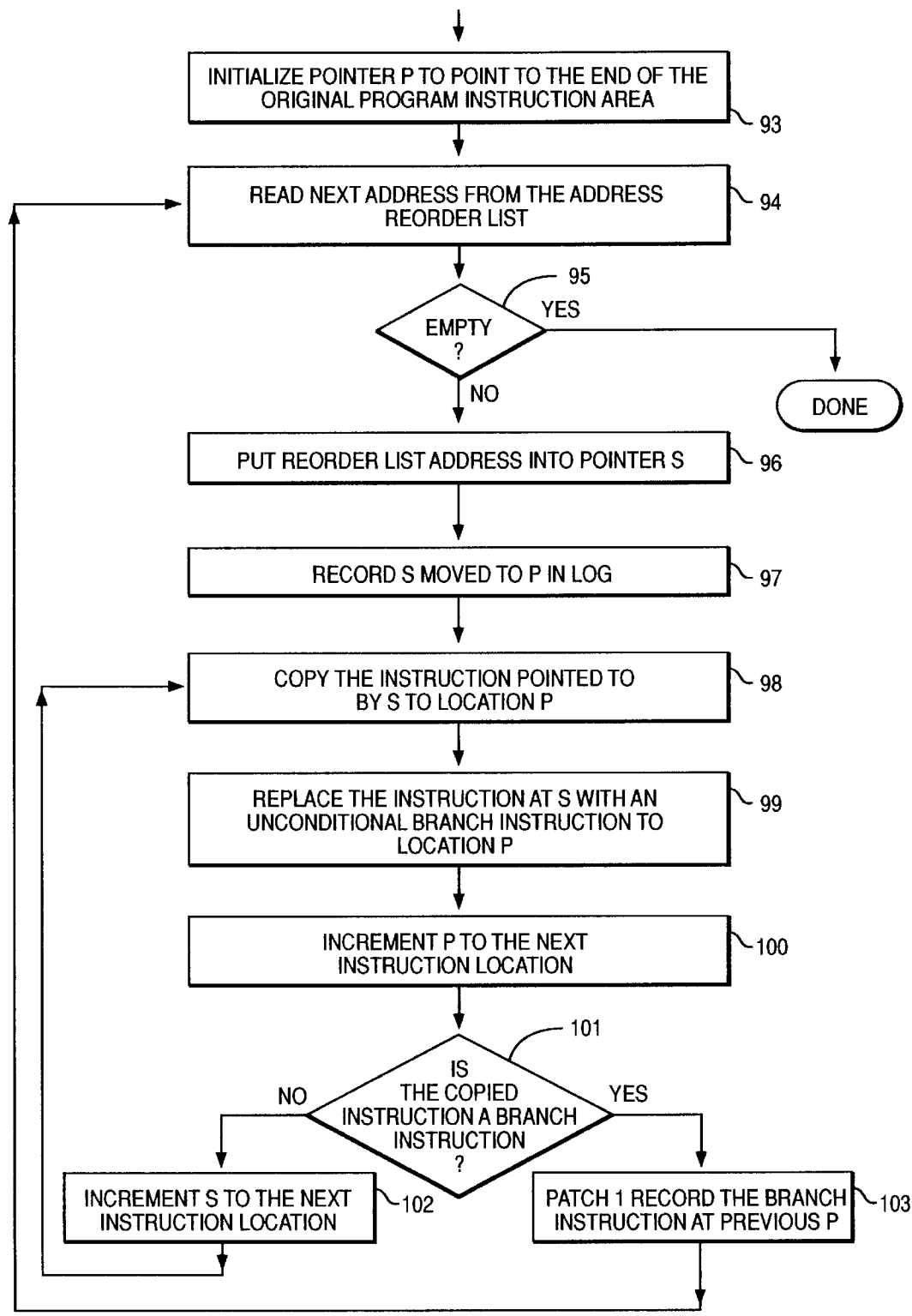
FIG. 12 shows the flow diagram for reordering the instructions in a program.

The program is then reordered as illustrated in FIG. 12. At step 93, a pointer p is initialized to point to the end of the original program. The next basic block address is then read at step 94 from the address reorder list. It will be understood that the reorder list may be saved in a file, as in the preferred embodiment, or stored in memory. Further, the trace or profile data can be stored in memory (or saved in a file) and then processed to determine the optimal reordering. The reorder list may be stored separately in memory or saved in a file.

If, at step 95, it is determined that the reorder list is empty, the reordering process is complete. Otherwise, the process continues at step 96 where the reorder list address is saved in pointer s. At step 97, an entry is made in the "moved to" log indicating that the basic block at address s is moved to location p. This log will be used later in the process steps 105, 106, 107 to "fixup" any branches, which branch to the original address, s, so that they will directly branch to the new location, p. At step 98, the instruction pointed to by s is copied to location p. The instruction at s is replaced, at step 99, with an unconditional branch to location p. This "forwarding address", which indicates the new location of this instruction, will guarantee the functionality of the program as explained previously, i.e dynamic branches will be directed to the reordered code. At step 100, pointer p is incremented to point to the next available instruction location. If it is determined at step 98 that the instruction copied to p in step 98 is a branch instruction (indicating the end of the basic block), then the process continues to step 103. Otherwise, at step 102 pointer s is incremented to the next instruction in the basic block and the process returns to step 98. At 103, the branch instruction copied at step 98 is patched and recorded as detailed in FIG. 13. The reordering process then loops back to step 94.

Figure 13:
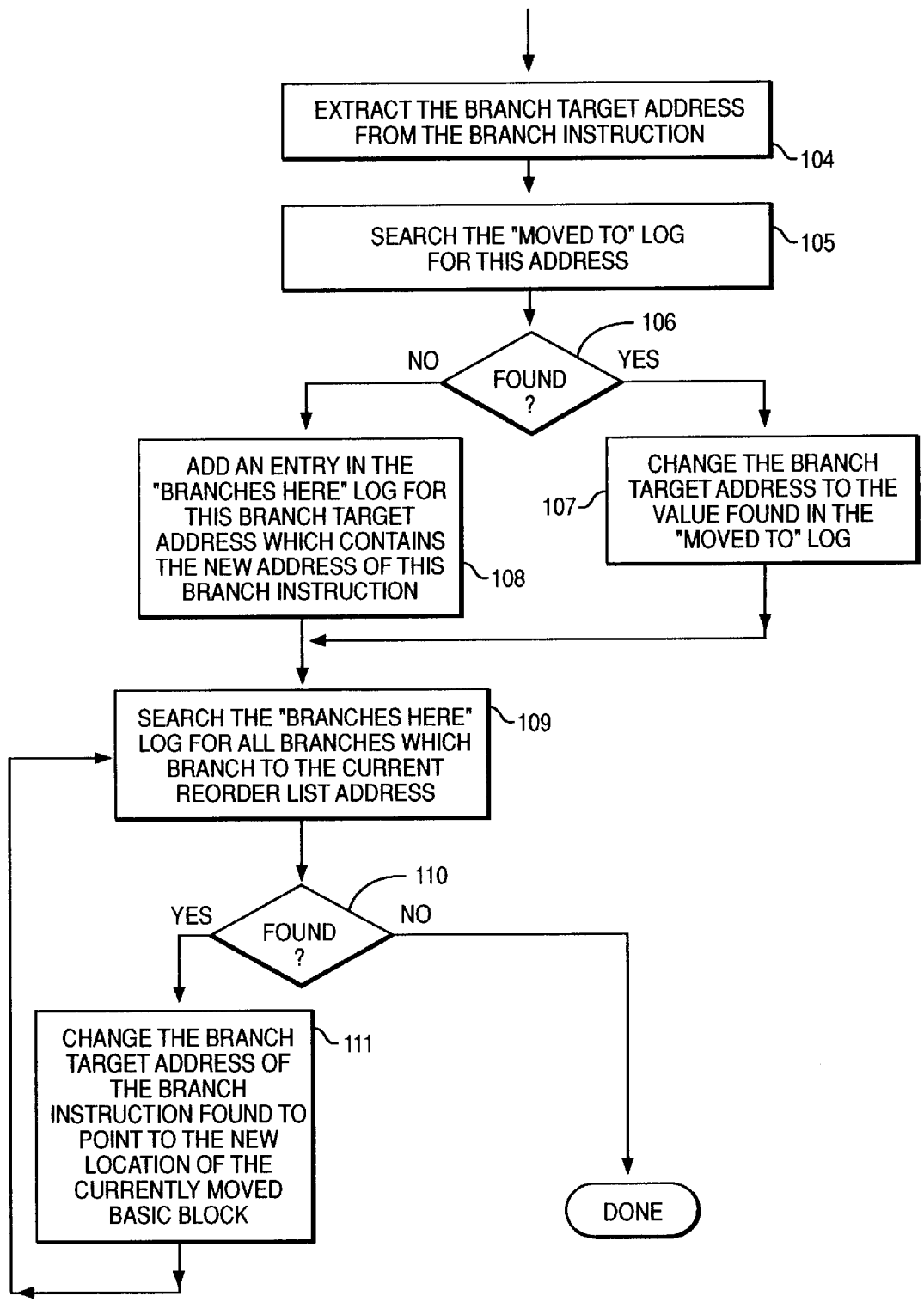
FIG. 13 is a flow diagram showing the details of the present invention including replacing the branch instruction of a reordered basic block and the associated cleanup work required during program reordering.

FIG. 13 shows the details of patching and recording the moved branch instruction. At step 104, the branch target address is extracted from the branch instruction. The "moved to" log, written at 97, is searched, at step 105, for this branch target address. If, at step 106, it is determined that the address has been found, the branch target address for this branch instruction is patched (changed) at step 107 to the value found in the log and the process continues to step 109. If the address is not found at step 106, an entry is added to the "branches here" log at step 108. The "branches here" log contains the address of every basic block which branches to a particular basic block for all basic blocks in the program. It is used to allow the update of all branches to a basic block when that basic block is moved. The process then continues to step 109 where the "branches here" log is searched for all branches which branch to the basic block currently being reordered (as indicated by the reorder list address in step 94). Step 110 determines if each branch has been found in the "branches here" log, if so, its branch target address is changed at step 111 to point to the new location. If no more matches are found at step 110, the process is complete for the branch target addresses. The entire process shown in FIG. 13 is then repeated for all branch fall-through addresses (i.e., the address path taken when a conditional branch is not taken or a branch and link (call) instruction returns. For this pass, instead of changing the branch target address, the fall-through path is potentially altered. If the fall-through path has changed, then an unconditional branch to the fall-through code is appended immediately after the branch instruction. Additionally, the opportunity arises during this process to improve hardware branch prediction (and thus, overall performance) by adjusting the branch condition. Toggling the branch condition of a conditional branch instruction, based upon the most often taken path indicated by profiling, and swapping the branch target and fall-through addresses can improve performance by increasing branch prediction accuracy. Although certain preferred embodiments have been shown and described it should be understood that many changes and modifications may be made therein without departing from the scope of the appended claims.

I claim:

1. A method of reordering the instructions within an executable file to optimize execution thereof by a data processing system, said method comprising the steps of:

recording, during execution of said instructions, trace information including address information;

selecting a subset of said instructions which are indicated by said trace information as being executed frequently;

moving each of said selected instructions from their original physical location to a new physical location at the end of the executable file; and indicating in each one of said original physical locations said new physical location corresponding to said moved instruction.

2. The method of claim 1 wherein a dynamically calculated branch, generated during execution of said reordered executable file, accesses one of said moved instructions from the original physical location of said moved instruction.

3. The method of claim 2 wherein the logic of one of said moved instructions is inverted.

4. An apparatus for reordering the instructions within an executable file to optimize execution thereof by a data processing system, said apparatus comprising:

means for recording, during execution of said instructions, trace information including address information;

means for selecting a subset of said instructions which are indicated by said trace information as being executed frequently; and means for moving each of said selected instructions from their original physical location to a new physical location at the end of the executable file; and means for indicating in each one of said original physical locations said new physical location corresponding to said moved instruction.

5. The apparatus of claim 4 wherein a dynamically calculated branch, generated during execution of said reordered executable file, accesses one of said moved instructions from the original physical location of said moved instruction.

6. The apparatus of claim 5 wherein the logic of one of said moved instructions is inverted.

7. A computer program product comprising:

a computer usable medium having computer readable program code means embodied therein for reordering the instructions within an executable file to optimize execution thereof by a data processing system, said computer readable program code means comprising:

means for recording, during execution of said instructions, trace information including address information;

means for selecting a subset of said instructions which are indicated by said trace information as being executed frequently; and means for moving each of said selected instructions from their original physical location to a new physical location at the end of the executable file; and means for indicating in each one of said original physical locations said new physical location corresponding to said moved instruction.

8. The computer program product of claim 7 wherein a dynamically calculated branch, generated during execution of said reordered executable file, accesses one of said moved instructions from the original physical location of said moved instruction.

9. The computer program product of claim 8 wherein the logic of one of said moved instructions is inverted.

* * * * *